Aug. 14, 1951     T. M. ENGLE     2,563,927
WHEELED SUPPORTING PLATFORM ATTACHMENT UNIT FOR JACKS
Filed Sept. 10, 1948     2 Sheets-Sheet 1

INVENTOR.
T. M. Engle
BY Robb & Robb
Attorneys.

Aug. 14, 1951 T. M. ENGLE 2,563,927
WHEELED SUPPORTING PLATFORM ATTACHMENT UNIT FOR JACKS
Filed Sept. 10, 1948 2 Sheets-Sheet 2

INVENTOR.
T. M. Engle

Patented Aug. 14, 1951

2,563,927

UNITED STATES PATENT OFFICE 2,563,927

WHEELED SUPPORTING PLATFORM ATTACHMENT UNIT FOR JACKS

Thomas M. Engle, Akron, Ohio, assignor of thirty-three and one-third per cent to Clarence C. Calvert, Akron, and thirty-three and one-third per cent to Thomas D. Graffius, Cuyahoga Falls, Ohio Application September 10, 1948, Serial No. 48,679

2 Claims. (Cl. 254—1)

The present invention comprises a novel wheeled platform unit designed especially as a supporting attachment unit for automobile jacks.

Portable automobile lifting jacks designed to be carried in the automobile for use on the road by the automobile user involve certain problems in respect to their use on account of the present-day designs of automobiles. The low-slung design of modern-day cars, and the long over-hang of the same forwardly and rearwardly of the supporting axles have virtually made impractical the use of lifting jacks designed to engage the vehicle axle for raising the same, because of the difficulty involved in positioning such jack at the proper point beneath the axle without the user getting under the car for this purpose. Obviously, this kind of operation involves getting the clothes dirty and is otherwise annoying to the user of the vehicle who is ordinarily not prepared for the accomplishment of such an operation.

The difficulties arising in connection with the employment of this type of lifting jack by the average car users have in large part caused the substitution of the so-called bumper jack for emergency use in connection with passenger automobile vehicles. While the bumper jack eliminates the necessity for getting under the car in that it is easier to position for the lifting operation, it is far from satisfactory from the standpoint of its efficiency as a lifting device since the resiliency of the springs of the automobile makes it necessary to raise the body unduly high in order to get the wheels off the ground for changing of a tire, and the result is that many times the vehicle becomes unbalanced when supported by the jack and falls off the latter.

With this difficulty in mind, there has been a trend in recent years toward the bringing back into use of an axle lifting jack for emergency use in connection with passenger automobile vehicles, and a large number of such axle lifting jacks, particularly of the lazy-tongs type, have been sold in recent years for this purpose. These jacks, however, are still subject to the same problems in reference to positioning the same in a proper position beneath the axle for the lifting operation.

With the foregoing in mind, it is a principal object of the present invention to provide a wheeled supporting platform attachment unit which may be readily attached to axle lift jacks of types now in use, without altering the design of the latter, said attachment unit enabling the proper positioning of the jack under the axle of the automobile without the necessity of the user getting underneath the latter, and said unit being designed so that when associated with the jack under load, the jack will not be able to shift its position relative to the ground or other surface upon which the vehicle is standing.

To the foregoing end, the attachment unit of my invention comprises a supporting platform yieldably carried upon wheels in such a manner that the platform is normally positioned out of contact with the ground or other surface engaged by the wheels, the platform having yieldable connection with the wheels whereby to permit the platform to engage the ground over a broad bearing area when said platform is placed under the load of the vehicle carried by the jack supported on said platform. The said platform is also provided with projections for digging into the supporting surface when the platform is so placed under load to further assist in preventing sliding movement of the platform relative to the supporting surface.

Other objects, advantages and features of the invention will appear from the following detail description taken in conjunction with the accompanying drawing, in which.

Figure 1:
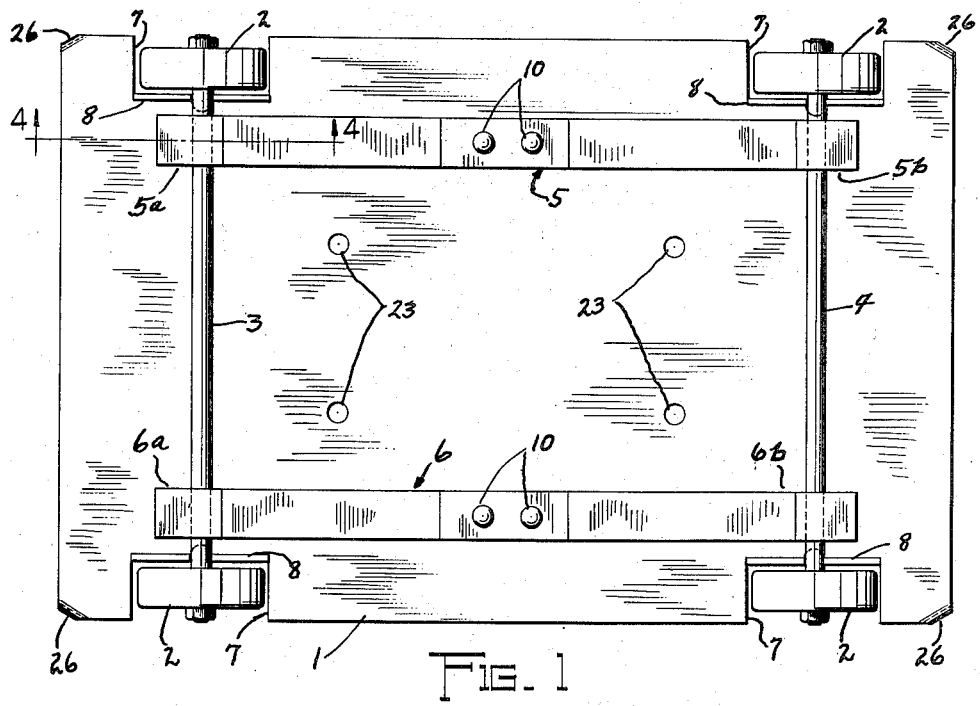
Figure 1 is a top plan view of the attachment unit of my invention.

Now referring to the drawings and describing the invention in detail, the attachment unit of my invention comprises a supporting platform 1, ground engaging wheels 2 carried upon spaced axles 3 and 4, the platform 1 being yieldingly associated with the wheels 2 by the provision of springs 5 and 6 cooperating with the axles 3 and 4.

The platform 1 preferably comprises a sheet metal plate of sufficient thickness to provide sufficient rigidity so that the platform member 1 is not readily deformable from its initial flat or plane condition. The platform member 1 is cut out adjacent the four corners thereof, as indicated at 7, to provide wheel receiving spaces for receiving the wheels 2. The metal of the plate forming the platform 1, which is cut transversely of the plate to form the spaces 7, is bent upwardly relatively to the platform 1 to form the bearing lugs 8 integral with the platform 1. These lugs 8 are each provided with a respective vertical axle receiving slot 9 open at its upper end. The axle 3 is received in the slots 9 in one transverse pair of oppositely disposed bearing lugs 8, and likewise the axle 4 is received in the slots 9 of the other transverse pair of oppositely disposed lugs 8, the slots 9 being of a width approximating, or slightly larger than, the diameter of the axles 3 and 4. The slots 9 may extend from their upper open end downwardly substantially to the plane of the upper surface of the platform 1 whereby when the axles 3 and 4 are received in the slots 9 of the lugs 8, said axles may lie in contact with the upper surface of the platform 1.

Figures 4, 5:
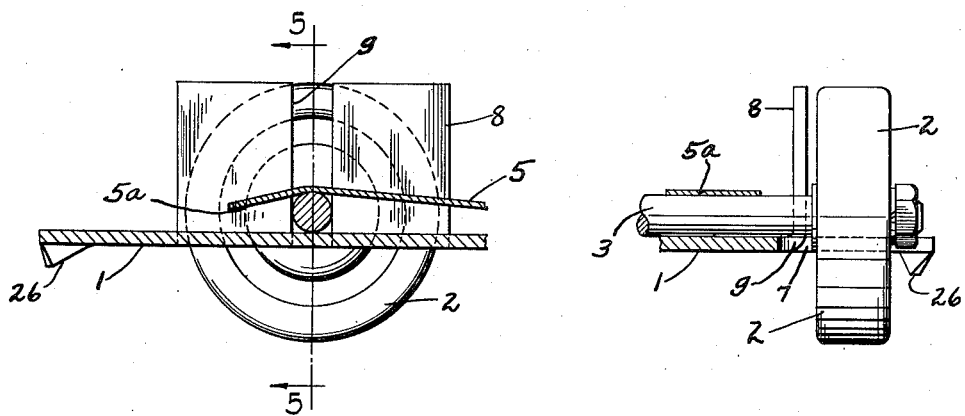
Figure 4 is a sectional view taken on the line 4—4 of Figure 1.
Figure 5 is a sectional view taken on the line 5—5 of Figure 4.

The spring members 5 and 6 are substantially flat spring members preferably formed of spring metal and are disposed to extend longitudinally of the platform member 1, the spring member 5 being secured adjacent its mid point to the platform 1 as by means of rivets 10, spring 5 arcuately curved adjacent each free end as indicated by 5a and 5b respectively, as seen best in Figure 4, the arcuate curvature being in a vertical plane or perpendicular to the plane of the spring member 5 undeformed.

At the arcuately curved portions 5a and 5b the respective ends of the spring member 5 engage over the axles 3 and 4 just inwardly of the lugs 8 at one side of the platform adjacent the wheels 2 at one end of each of the axles 3 and 4. In a similar manner the member 6 is secured to the platform 1 adjacent the opposite longitudinal edge thereof by means of rivets 10, and the spring member 6 is similarly formed with the arcuately curved portions 6a and 6b engaging over the axles 3 and 4 respectively adjacent the lugs 8 at the opposite side of the platform. The inner sides of the arcuate portions 5a and 5b, and 6a and 6b of the spring members 5 and 6 are in the nature of concave seats for the axles 3 and 4 engaged thereby.

The method of assembly of the attachment unit of my invention will be readily apparent. The axles 3 and 4 having the wheels 2 rotatably mounted thereon will be slipped into the vertically elongated slots 9 of opposing lugs 8 and then the spring members 5 and 6 secured to the platform 1 so that the free ends are engaged over the axles 3 and 4 to maintain the same in associated relation to the platform. Normally the wheels 2 engaging the ground or other supporting surface will support the platform 1 in spaced relation to said supporting surface in the manner illustrated in Figure 2, when there is no load on the platform. However, when there is sufficient load on the platform 1 to cause the spring members 5 and 6 to yield, the platform can move downwardly relatively to the axles 3 and 4, due to the yielding action of the springs, until the platform 1 engages the ground or other supporting surface, the latter condition being illustrated in Figure 3. Under the load causing yielding action of the springs 5 and 6, the axles 3 and 4 will be permitted to move upwardly in the slots 9 of the lugs 8 to the condition illustrated in Figure 3, the curved ends of the springs 5 and 6 still maintaining spring engagement with the axles 3 and 4 to retain them in the slots 9 under spring pressure.

Figure 2:
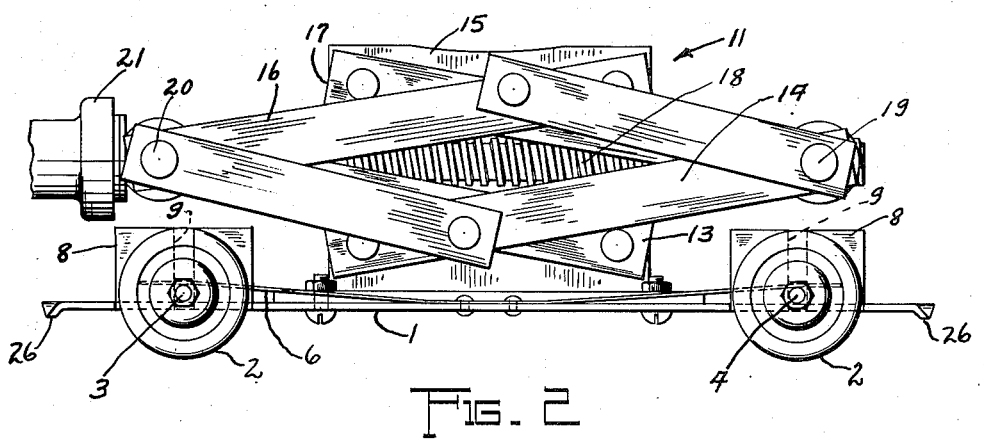
Figure 2 is a side elevation thereof showing a vehicle lifting jack carried thereon but not under load.
Figure 3:
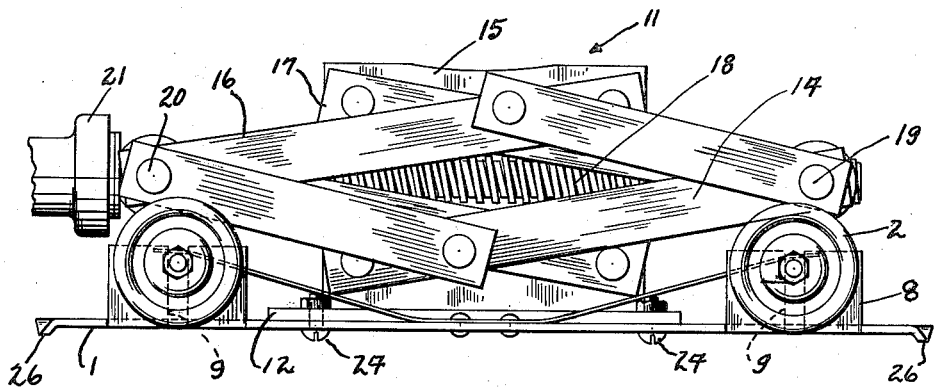
Figure 3 is a side elevational view similar to Figure 2, but showing the condition of the platform relative to the wheels when the jack carried on the platform is under load.

In Figures 2 and 3 there is illustrated a conventional form of lazy tong jack mounted upon the platform 1 of the attachment device. These jacks consist of a base member 12 to which the lower ends of certain of the lazy tongs links 13 and 14 are pivoted, a load bearing member 15 to which the upper ends of certain of the links 16 and 17 are pivoted, a screw member 18 working between the intermediate pivot points 19 and 20, and a socket member 21 associated with the screw 18 for receiving detachably a long crank or operating member for operating the screw for raising and lowering the jack.

The platform plate member 1 is provided with apertures 23 for receiving nut and bolt fastening means 24, the bolts of which may extend through corresponding apertures in the base member 12 of the jack generally designated by the numeral 11, the fastening means 24 constituting means for detachably connecting the jack 11 in supported relation upon the platform 1 of the attachment unit.

It will be noted that the platform 1 has a relatively large bearing surface or area whereby when a lifting jack carried thereon is placed under the load of the vehicle being raised, the platform 1 will have a relatively large ground engaging surface or bearing area providing a broad substantial base for supporting the automobile lifted on the jack. The large bearing area of the platform engaging the ground under such condition will prevent unauthorized movement of the attachment unit under loaded condition with the platform 1 frictionally engaging the ground or other supporting surface with a large frictional bearing area. Further assisting the prevention of unauthorized movement of the attachment unit under loaded condition is the provision of projections 26 formed at each of the four corners of the plate member comprising the platform 1, said projections projecting downwardly from the platform 1 and designed to dig into the ground or other supporting surface upon which the device is used, when under loaded condition. From the foregoing, it will be seen that my invention provides an attachment unit comprising a wheeled platform support which may be readily detachably associated with automobile lifting jacks now on the market or already in use, to provide a wheeled support for the latter which may be readily manipulated by means of the operating handle of the jack for properly positioning the jack under the axle of the vehicle, and then when the vehicle is lifted by means of the jack, the resultant load thereon will cause the platform 1 to engage the ground and prevent unauthorized movement of the jack relative to such traction surface.

It may be noted that the area of the under surface, constituting the traction surface engaging area, of the platform 1, has an area substantially the same as the upper surface, constituting the load bearing area, of said platform.

Having thus described my invention, what I claim as new and desire to secure by Letters Patent of the United States, is:

1. An attachment unit of the class described, comprising, in combination, a load bearing platform comprising a flat rectangular plate member cut out adjacent each corner thereof to provide wheel receiving spaces, the cut-out portions of the plate member being bent upwardly relative thereto to extend in a plane substantially normal to the plane of the platform and to provide longitudinally spaced pairs of transversely spaced axle bearing lugs, said lugs each having a vertically elongated axle receiving slot, a wheel axle received in the slots of one pair of transversely spaced lugs, and another wheel axle received in the slots of the other pair of transversely spaced lugs, supporting wheels for said platform carried by said axles, and a pair of flat spring elements, each of said spring elements being secured to the platform at a point intermediate its ends, each spring element extending longitudinally of said platform and having free yieldable ends engaging over said axles adjacent to the axle bearing lugs at one side of the platform, said spring elements normally acting to suspend the platform upon said wheels in spaced relation to the traction surface engaged thereby, the said wheels being under such condition, received in the wheel receiving spaced aforesaid, said spring means being yieldable to permit the platform when under load to yield downwardly relative to the wheels into engagement with the traction surface.

2. An attachment unit of the class described, comprising, in combination, a load bearing platform comprising a flat rectangular plate member cut out adjacent each corner thereof to provide wheel receiving spaces, the cut-out portions of the plate member being bent upwardly relative thereto to extend in a plane substantially normal to the plane of the platform and to provide longitudinally spaced pairs of transversely spaced axle bearing lugs, said lugs each having a vertically elongated axle bearing slot, a wheel axle received in the slots of one pair of transversely spaced lugs, and another wheel axle received in the slots of the other pair of transversely spaced lugs, supporting wheels for said platform carried by said axles, and a pair of flat spring elements, each of said spring elements being secured to the platform at a point intermediate its ends, each spring element extending longitudinally of said platform and having free yieldable ends engaging over said axles adjacent the axle bearing lugs at one side of the platform, said spring elements normally acting to urge the axles downwardly of said lugs toward the lower ends of said slots to suspend the platform upon said wheels in spaced relation to the traction surface engaged thereby, the said wheels being, under said condition, received in the wheel receiving spaces aforesaid, said spring elements being yieldable to permit upward movement of said axles in said slots whereby when the platform is under load, the same will yield downwardly relative to the wheels into engagement with the traction surface, said plate member having its corner portions bent downwardly to form traction surface penetrating projections to penetrate the traction surface when the platform yields into engagement therewith under load.

THOMAS M. ENGLE.

REFERENCES CITED

The following references are of record in the file of this patent:

UNITED STATES PATENTS

| Number | Name | Date |
|---|---|---|
| 191,824 | Batchelder | June 12, 1877 |
| 1,415,857 | Avery | May 16, 1922 |
| 2,297,556 | Hermann | Sept. 29, 1942 |
| 2,456,218 | Semisch | Dec. 14, 1948 |